(12) United States Patent
Trager

(10) Patent No.: US 8,366,021 B2
(45) Date of Patent: Feb. 5, 2013

(54) WINDSHIELD CLEANER

(75) Inventor: Christian Arthur Trager, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 257 days.

(21) Appl. No.: 12/875,846

(22) Filed: Sep. 3, 2010

(65) Prior Publication Data

US 2012/0056004 A1    Mar. 8, 2012

(51) Int. Cl.
*B05B 1/10* (2006.01)
(52) U.S. Cl. .................................. 239/284.1; 239/284.2
(58) Field of Classification Search ............... 239/284.1, 239/284.2, 69, 66, 1, 302, 305
See application file for complete search history.

(56) References Cited

U.S. PATENT DOCUMENTS

| | | | |
|---|---|---|---|
| 3,253,786 A | 5/1966 | Parmelee | |
| 4,090,668 A | 5/1978 | Kochenour | |
| 4,331,295 A * | 5/1982 | Warihashi | 239/284.1 |
| 4,823,058 A | 4/1989 | Buchanan, Jr. et al. | |
| 5,043,088 A | 8/1991 | Falla | |
| 5,141,160 A | 8/1992 | Waters | |
| 5,254,916 A | 10/1993 | Hopkins | |
| 5,525,879 A | 6/1996 | Wainwright | |
| 5,819,360 A * | 10/1998 | Fujii | 15/250.04 |
| 6,237,861 B1 | 5/2001 | Northrop et al. | |
| 6,561,209 B2 | 5/2003 | Wojan et al. | |
| 6,615,438 B1 | 9/2003 | Franco et al. | |
| 7,108,754 B2 | 9/2006 | Franco et al. | |

* cited by examiner

*Primary Examiner* — Davis Hwu
(74) *Attorney, Agent, or Firm* — Gifford, Krass, Sprinkle, Anderson & Citkowski, P.C.

(57) ABSTRACT

The present invention discloses a windshield wiper system that affords for deicing of a windshield for a motor vehicle. The system includes a first container having a first liquid, a second container having a second liquid along with a spray nozzle or jet proximate to the windshield and in fluid communication with the first container and the second container. A pump operable to pump or force the second liquid through the spray nozzle and onto the windshield is also included. In addition, a time delay switch activates the windshield wiper only after the second liquid has been on the windshield a preset time.

10 Claims, 1 Drawing Sheet

WINDSHIELD CLEANER

FIELD OF THE INVENTION

The present invention is related to a windshield cleaner, and in particular, to a supplemental windshield cleaner that can be used to deice a windshield.

BACKGROUND OF THE INVENTION

Windshields for motor vehicles are known to have windshield wipers to remove rain, debris, and the like from the windshield. A windshield wiper typically rotates about a fixed pivot point with an elastomer blade moving and/or sliding in a back and forth direction over the windshield to push water, debris, and the like from the surface thereof.

Motor vehicles are also known to have systems that can provide washer fluid onto the windshield to assist in the removal of dirt, dust, bugs, etc. Such washer fluid systems generally use an electric pump to force fluid from a storage container through spray nozzles or jets mounted either beneath the windshield or beneath the windshield wiper blades. In addition, heretofor systems have required activation of the windshield wiper blades when the electric pump is activated.

In some instances, antifreeze, methylated spirits, ethanol mixtures, ethylene glycol mixtures, and the like can be added to the washer fluid in order to reduce the freezing temperature of the fluid and prevent freezing thereof during cold environmental temperatures, for example during winter. Such types of washer fluid mixtures can remove thin layers of frost from the windshield, however even thin layers of ice are typically removed by scraping or the application of a deicer liquid.

Deicer liquids are most commonly applied by hand, i.e. an individual holds a container of the deicer liquid and sprays it onto the windshield, after which the liquid is allowed to sit for a predetermined period of time in order to give the ice time to melt. Thereafter, the melted ice, and possibly any remaining ice, is removed by scraping of the windshield, and in some instances, by operation of the windshield wipers. However, application of the deicer liquid by hand can be inconvenient and uncomfortable since an individual has to stand outside in the cold weather to scrap the ice and/or during application of the deicer liquid. As such, a windshield washer system that provides for melting of ice on a windshield while an individual is seated within the motor vehicle would be desirable.

SUMMARY OF THE INVENTION

The present invention discloses a windshield wiper system for a motor vehicle, the system having a windshield and a windshield wiper operable to wipe at least a portion of the windshield. The system includes a first container having a first liquid and a second container having a second liquid. In addition, a spray nozzle or jet proximate to the windshield and in fluid communication with the first container and the second container is provided. A pump can also be included and be in fluid communication with the second container and the spray nozzle, the pump being operable to pump or force the second liquid through the spray nozzle and onto the windshield. It is appreciated that the first liquid can be a windshield washer fluid and the second liquid can be a windshield deicer fluid, bug-removal fluid and the like.

A time delay switch is provided and is operable to activate the windshield wiper only after the second liquid has been sprayed onto the windshield a preset time. In this manner, the second liquid can be given sufficient time to assist in the removal of material such as debris, ice, and the like from the windshield before it is wiped away by the windshield wiper.

The time delay switch can be part of an electronic control unit (ECU) for the motor vehicle and the ECU may or may not activate the pump only when a transmission of the motor vehicle is in Park. The pump can also be in fluid communication with the first container and be operable to pump the first liquid through the spray nozzle and onto the windshield. In some instances, the ECU can activate the pump to force the first liquid and the second liquid through the spray nozzle at different times or both at the same time.

In the alternative to a single pump operable to force the first liquid and the second liquid through the spray nozzle, a first pump operable to force the first liquid through the spray nozzle and a second pump that is operable to force the second liquid through the spray nozzle can be included. In such systems, the ECU can activate the first pump and the second pump at different times or both at the same time.

A process for deicing a windshield of the motor vehicle is also provided, the process including providing the windshield wiper system disclosed above, the system having a first liquid which is windshield washer fluid and a second liquid that is windshield deicer fluid. The process includes activating a windshield deicer switch, the windshield deicer switch activating the pump and the pump forcing windshield deicer liquid through the spray nozzle and onto the windshield. It is appreciated that the windshield deicer liquid can melt at least a portion of any ice that is on the windshield.

After the windshield deicer switch has been activated, the time delay switch activates the windshield wiper after a preset time has elapsed, the windshield wiper wiping away melted ice from the windshield. In some instances, activation of the windshield deicer switch affords for activation of the pump only when an ECU receives a signal from a transmission of the motor vehicle that the transmission is in Park. In this manner, the motor vehicle cannot be driven during deicing of the windshield. It is appreciated that the process can also be used to apply bug-removal fluid to the windshield and aid in cleaning and/or removing bugs, parts of bugs, etc., from the windshield.

DETAILED DESCRIPTION OF THE INVENTION

The present invention provides a windshield wiper system that can be used for deicing a windshield of a motor vehicle while a driver of the vehicle sits therewithin. As such, the present invention has utility as a component for a motor vehicle.

The windshield wiper system can include a typical windshield washer apparatus that includes a container with washer fluid therewithin. In addition, a pump that forces the washer fluid through a washer fluid line and spray nozzles onto the windshield is included. Such washer fluid systems are known to those skilled in the art and can be used to assist in the removal of debris, bugs, etc. from the windshield.

The windshield wiper system also includes a second liquid such as deicer liquid, bug-removal liquid, etc., contained in a separate container which can also be sprayed onto the windshield for the purpose of melting ice thereon, helping dislodge debris, and the like. In some instances, a time delay switch can be included which prevents the windshield wipers from wiping across the windshield until a predefined time has elapsed after the second liquid is applied. In this manner, if the second liquid is a deicer liquid, the deicer liquid is given sufficient time to melt any ice that is on the windshield.

An electronic control unit (ECU) can be provided and be in electrical communication with a pump that forces the second liquid through the spray nozzles and onto the windshield so that the second liquid is not sprayed onto the windshield unless the vehicle is stationary and the vehicle transmission is in Park and thus an individual cannot drive the vehicle while the windshield is being deiced. It is appreciated that the time delay switch may or may not be incorporated as part of the ECU.

Figure 1:
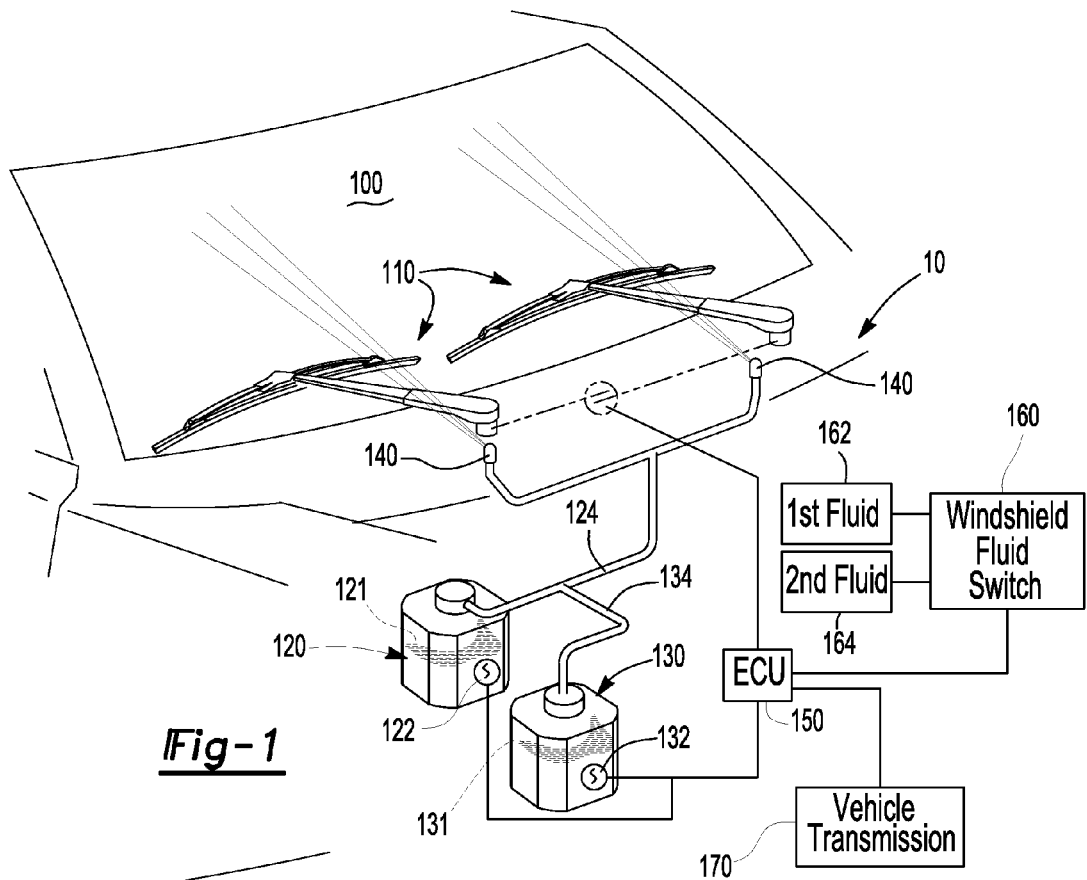
FIG. 1 is a schematic illustration of a windshield wiper system according to an embodiment of the present invention.

Turning now to FIG. 1, a windshield wiper system according to an embodiment of the present invention is shown generally at reference numeral 10. The windshield wiper system includes a windshield 100 and one or more windshield wipers 110. A first container 120 containing a first liquid 121 and a pump 122 can have a first liquid line 124 that affords for the first liquid 121 to be forced through one or more spray nozzles or jets 140. In this manner, the first liquid 121 can be sprayed onto the windshield 100. It is appreciated that a first fluid switch 162 that may or may not be part of a windshield fluid switch 160 can be depressed and/or activated such that the pump 122 is energized and the first liquid 121 is sprayed onto the windshield 100.

The system 10 further includes a second container 130 containing a second liquid 131 and a second pump 132. The second pump 132 is operable to force the second liquid 131 through a second liquid line 134 and through the one or more spray nozzles 140. The second pump 132 can be activated by a second fluid switch 164 which may or may not be part of the windshield fluid switch 160. For example and for illustrative purposes only, the first liquid 121 can be windshield washer fluid for typical washing and the second liquid 131 can be deicer fluid for deicing of the windshield 100, bug-removal fluid for cleaning bugs from (i.e. de-bugging) the windshield 100 and the like.

In some instances, an ECU 150 can be in electronic connection with the first pump 122, the second pump 132, the one or more windshield wipers 110, the windshield fluid switch 160, the first fluid switch 162, the second fluid switch 164 and/or a transmission 170 for the vehicle. A time delay switch which may or may not be part of the ECU 150 can prevent activation of the one or more windshield wipers 110 until a predefined time has elapsed after the second liquid 131 has been sprayed onto the windshield 100. In this manner, the windshield wiper system 10 prevents a user from wiping away the second liquid 131 before it has had time to melt any ice on a windshield, dislodge debris from a windshield, and the like. In addition, in order to prevent an individual from attempting to deice the windshield 100 while driving the motor vehicle, the ECU 150 can prevent activation of the motor 132 unless the transmission 170 is in Park and thus the motor vehicle is stationary.

Figure 2:
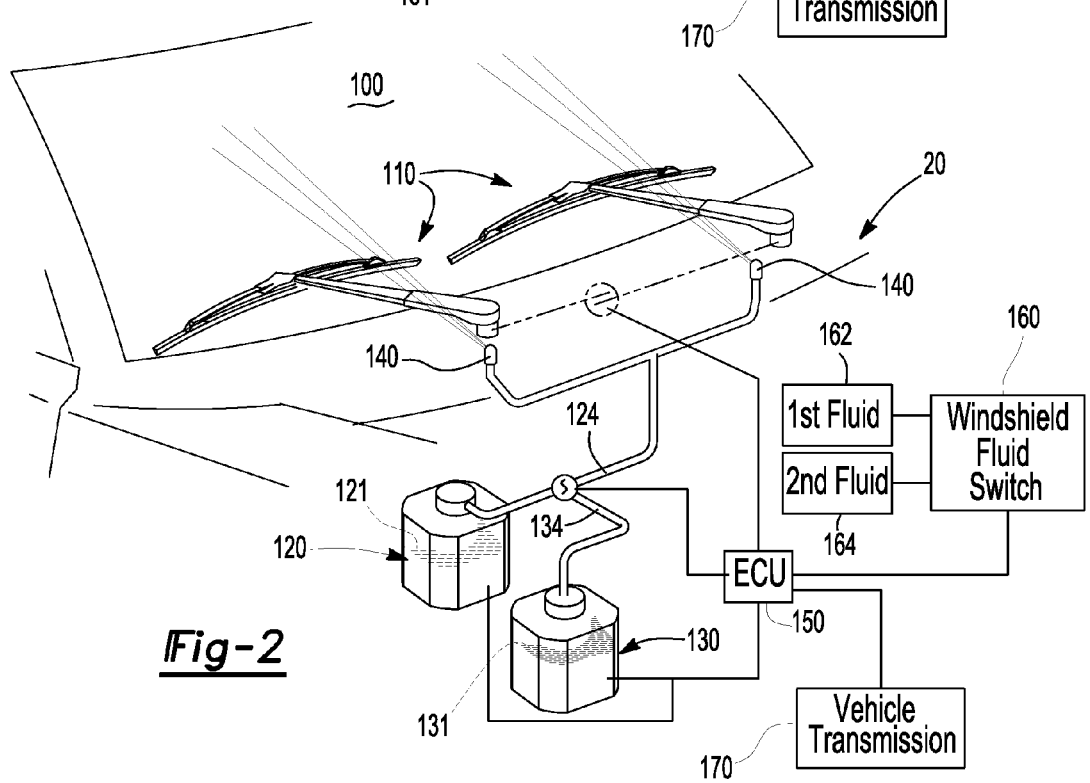
FIG. 2 is a schematic illustration of a windshield wiper system according to another embodiment of the present invention.

Turning now to FIG. 2, a windshield wiper system according to another embodiment of the present invention is shown generally at reference numeral 20. The system 20 is similar to the system 10 except for the use of a single pump 125 instead of the first pump 122 and the second pump 132 shown in FIG. 1. It is appreciated that the second pump 125 can have one or more valves that afford for pumping of the first liquid 121 and the second liquid 131 simultaneously, or in the alternative, only pumping of one of the liquids at a time. In addition, although the first container 120 and the second container 130 are shown as two separate containers, a single container can be used with a partition such that the first liquid 121 is contained within a first portion of the container and the second liquid 131 is contained in a second portion of the container.

The windshield wiper system can be used as part of a process for deicing and/or de-bugging a windshield of the motor vehicle by activating a windshield deicer and/or debugging switch, the windshield deicer switch activating the second pump 132, or in the alternative the single pump 125, such that the second liquid 131 in the form of deicing and/or bug-removal liquid is forced through the one or more spray nozzles 140 and onto the windshield 100.

The deicing liquid can be any deicing liquid known to those skilled in the art, for example and illustratively including Prestone Deicer for Windows and Wipers provided by Honeywell Consumer Products Group located in Danbury, Conn. Such a deicer liquid can contain methyl alcohol, ethylene glycol, propylene glycol, carbon dioxide, and the like. For example and for illustrative purposes only, such a liquid can contain between 60 to 80 percent methyl alcohol, 0 to 20 percent ethylene glycol, 0 to 20 percent propylene glycol, and other liquid components that can enhance the melting of ice on the windshield, spraying of the liquid on the windshield, etc. The bug-removal can be any bug-removal liquid known to those skilled in the art, for example and illustratively including Rain X® Bug Remover Windshield Washer Fluid provided by SOPUS Products located in Houston, Tex.

After the windshield deicer and/or de-bugging switch has been activated and the windshield deicer and/or bug-removal liquid has been sprayed onto the windshield 100, the ECU 150 and/or a time delay switch activates the windshield wiper after a preset time has elapsed. In some instances, the preset time can be greater than 5 seconds, 15 seconds, 30 seconds, 45 seconds, 1 minute, 2 minutes, 3 minutes, 5 minutes, 10 minutes, and the like. As stated above, the ECU 150 can also prevent activation or energizing of the second pump 132 or single pump 125 if a transmission of the motor vehicle is not in Park and/or the motor vehicle is not stationary. In this manner an individual is prevented from driving while deicing the windshield of the motor vehicle.

The invention is not restricted to the illustrative examples or embodiments described above. The examples or embodiments are not intended as limitations on the scope of the invention. Methods, apparatus, compositions, and the like described herein are exemplary and not intended as limitations on the scope of the invention. Changes therein and other uses will occur to those skilled in the art. As such, the scope of the invention is defined by the scope of the claims.

I claim:

1. A windshield wiper system for a motor vehicle comprising:
   a windshield and a windshield wiper operable to wipe at least a portion of said windshield;
   a first container having a first liquid and a second container having a second liquid;
   a spray nozzle proximate said windshield and in fluid communication with said first container and said second container;
   a pump in fluid communication with said second container and said spray nozzle, said pump operable to force said second liquid through said spray nozzle onto said windshield; and
   a time delay switch that is part of an electronic control unit (ECU) for the motor vehicle and is operable to activate said windshield wiper only after a preset time has elapsed after said pump has forced said second liquid through said spray nozzle and onto said windshield;

said ECU activating said pump only when a transmission of the motor vehicle is in Park;

said pump is in fluid communication with said first container and forcing said first liquid through said spray nozzle onto said windshield; and said ECU activating said pump to force said first liquid and said second liquid through said spray nozzle onto said windshield simultaneously.

2. The windshield wiper system of claim 1, wherein said pump is a first pump operable to force said first liquid through said spray nozzle and a second pump operable to force said second liquid through said spray nozzle.

3. The windshield wiper system of claim 2, wherein said ECU activates said first pump and said second pump simultaneously.

4. The windshield wiper system of claim 1, wherein said first liquid is a windshield washer liquid and said second liquid is a windshield deicer liquid.

5. A process for deicing a windshield of a motor vehicle, the process comprising:

providing a motor vehicle having:

a windshield and a windshield wiper operable to wipe at least a portion of the windshield;

a first container having a windshield washer liquid and a second container having a windshield deicer liquid;

a spray nozzle proximate the windshield and in fluid communication with the first container and the second container;

a first pump operable to force the windshield washer liquid through the spray nozzle and a second pump operable to force the windshield deicer liquid through the spray nozzle;

a windshield deicer switch operable to activate the pump and having a time delay switch that activates the windshield wiper only after a preset time has elapsed after the pump has forced the windshield deicer liquid through the spray nozzle and onto the windshield;

an electronic control unit (ECU) in electrical communication with the windshield wiper, the first pump, the second pump, the windshield deicer switch and the time delay switch, the time delay switch being part of the ECU and the ECU allowing the second pump to be activated only when a transmission for the motor vehicle is in Park;

activating the windshield deicer switch, the windshield deicer switch activating the second pump and the second pump forcing the windshield deicer liquid through the spray nozzle and onto the windshield, the windshield deicer liquid melting at least a portion of any ice on the windshield; and the time delay switch activating the windshield wiper after the preset time has elapsed, the windshield wiper wiping melted ice from the windshield.

6. The process of claim 5, wherein the ECU activates the first pump and the second pump simultaneously.

7. A windshield wiper system for a motor vehicle comprising:

a windshield and a windshield wiper operable to wipe at least a portion of said windshield;

a first container having a first liquid and a second container having a second liquid;

a spray nozzle proximate said windshield and in fluid communication with said first container and said second container;

a first pump in fluid communication with said first container and operable to force said first liquid through said spray nozzle onto said windshield;

a second pump in fluid communication with said second container and operable to force said second liquid through said spray nozzle onto said windshield; and a time delay switch that is part of an electronic control unit (ECU) for the motor vehicle and is operable to activate said windshield wiper only after a preset time has elapsed after said second pump has forced said second liquid through said spray nozzle and onto said windshield.

8. The windshield wiper system of claim 7, wherein said ECU activates said second pump only when a transmission of the motor vehicle is in Park.

9. The windshield wiper system of claim 7, wherein said ECU activates said first pump and said second pump to force said first liquid and said second liquid through said spray nozzle onto said windshield simultaneously.

10. The windshield wiper system of claim 7, wherein said first liquid is a windshield washer liquid and said second liquid is a windshield deicer liquid.

* * * * *